US008543657B2

(12) United States Patent
Hong et al.

(10) Patent No.: US 8,543,657 B2
(45) Date of Patent: Sep. 24, 2013

(54) DATA COMMUNICATION SYSTEM AND METHOD USING A WIRELESS TERMINAL

(75) Inventors: Seung-Heun Hong, Seoul (KR); Joon-Wook Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 2157 days.

(21) Appl. No.: 10/139,301

(22) Filed: May 3, 2002

(65) Prior Publication Data
US 2003/0208555 A1 Nov. 6, 2003

(51) Int. Cl.
*G06F 15/16* (2006.01)

(52) U.S. Cl.
USPC .......... 709/217; 358/1.15; 370/331; 370/475; 370/395.52; 455/414.1; 455/407

(58) Field of Classification Search
USPC ................. 709/217, 219, 246, 247, 227, 238, 709/225, 218, 245, 249, 200, 206, 223, 207; 705/14; 370/352, 368, 331, 474, 338, 395.52; 713/168; 455/414, 417, 418, 407; 358/407, 358/1.15
See application file for complete search history.

(56) References Cited

U.S. PATENT DOCUMENTS

| | | | | |
|---|---|---|---|---|
| 5,862,321 A * | 1/1999 | Lamming et al. | ............. | 709/200 |
| 6,401,113 B2 * | 6/2002 | Lazaridis et al. | ............. | 709/207 |
| 6,526,275 B1 * | 2/2003 | Calvert | ............. | 455/418 |
| 6,542,491 B1 * | 4/2003 | Tari et al. | ............. | 370/338 |
| 6,557,029 B2 * | 4/2003 | Szymansky | ............. | 709/206 |
| 6,691,106 B1 | 2/2004 | Sathyanarayan | | |
| 6,701,378 B1 * | 3/2004 | Gilhuly et al. | ............. | 709/249 |
| 6,731,612 B1 | 5/2004 | Koss | | |
| 6,944,661 B2 * | 9/2005 | Moore et al. | ............. | 709/225 |
| 6,957,275 B1 * | 10/2005 | Sekiguchi | ............. | 709/245 |
| 7,028,102 B1 * | 4/2006 | Larsson et al. | ............. | 709/246 |
| 7,043,563 B2 * | 5/2006 | Vange et al. | ............. | 709/245 |
| 7,079,511 B2 * | 7/2006 | Abrol et al. | ............. | 370/331 |
| 7,149,506 B2 * | 12/2006 | Osterhout et al. | ............. | 455/417 |
| 7,199,893 B2 * | 4/2007 | Uchiyama et al. | ............. | 358/1.15 |
| 7,233,408 B2 * | 6/2007 | Henderson et al. | ............. | 358/1.15 |
| 7,266,590 B2 * | 9/2007 | Nakaoka et al. | ............. | 709/219 |
| 2001/0029531 A1 * | 10/2001 | Ohta | ............. | 709/223 |
| 2001/0032254 A1 * | 10/2001 | Hawkins | ............. | 709/219 |
| 2001/0053691 A1 * | 12/2001 | Harma | ............. | 455/419 |
| 2002/0024686 A1 * | 2/2002 | Uchiyama et al. | ............. | 358/407 |
| 2002/0039357 A1 * | 4/2002 | Lipasti et al. | ............. | 370/338 |
| 2002/0087683 A1 * | 7/2002 | Szondy | ............. | 709/225 |
| 2002/0087861 A1 * | 7/2002 | Segev et al. | ............. | 713/168 |
| 2002/0112014 A1 * | 8/2002 | Bennett et al. | ............. | 709/206 |
| 2002/0120515 A1 * | 8/2002 | Morimoto et al. | ............. | 705/14 |
| 2002/0132612 A1 * | 9/2002 | Ishii | ............. | 455/414 |
| 2002/0156984 A1 * | 10/2002 | Padovano | ............. | 711/148 |
| 2003/0185240 A1 * | 10/2003 | Vuong | ............. | 370/474 |
| 2003/0208602 A1 * | 11/2003 | Bhalla et al. | ............. | 709/227 |
| 2004/0136358 A1 * | 7/2004 | Hind et al. | ............. | 370/352 |

(Continued)

*Primary Examiner* — Dustin Nguyen
(74) *Attorney, Agent, or Firm* — The Farrell Law Firm, P.C.

(57) ABSTRACT

There is provided a data communication method using a wireless terminal capable of accessing the Internet. The wireless terminal accesses the Internet, and then sends a data transmission request to a content provider. The wireless terminal provides the content provider with an IP address and associated information of a data terminal to which the data is to be transmitted. The content provider then transmits the data to the data terminal based on the IP address and the associated information. Preferably, the content provider sends a data transmission end message to the wireless terminal after completion of the data transmission.

11 Claims, 4 Drawing Sheets

(56) References Cited

U.S. PATENT DOCUMENTS

2004/0199665 A1* 10/2004 Omar et al. .................. 709/238
2005/0055461 A1* 3/2005 Murthy et al. ............... 709/245
2005/0068947 A1* 3/2005 Sanathana Murthy
 et al. ............................ 370/368
2007/0136480 A1* 6/2007 Stephenson et al. .......... 709/227
2007/0153805 A1* 7/2007 Brown ..................... 370/395.52

* cited by examiner

DATA COMMUNICATION SYSTEM AND METHOD USING A WIRELESS TERMINAL

BACKGROUND OF THE INVENTION

1. Field of the Invention

The present invention relates generally to a wireless terminal, and in particular, to a wireless terminal capable of accessing the Internet.

2. Description of the Related Art

Recently, as many multimedia communication networks are built up, users can get a great variety of information over the Internet. To this end, research has been carried out on technology for accessing the Internet using a wireless terminal. Also, there is a demand for a multifunction wireless terminal capable of accessing the Internet. To meet the demand, terminal manufacturers recently introduced wireless terminals capable of not only getting various information by accessing to the Internet, but also downloading audio data files such as MP3 files from the Internet and playing the downloaded audio data files. Hence, the user can conveniently get desired information over the Internet using the wireless terminal, and when necessary, store the information in the wireless terminal for future use.

FIG. 1 illustrates a control flow diagram for data communication between a wireless terminal and a content provider over the Internet. Referring to FIG. 1, if a wireless terminal attempts to access a content provider (CP) over the Internet by sending an access request (step 101), the content provider sends an access response to the wireless terminal (step 102). Upon receipt of the access response, the wireless terminal sends a data transmission request to the content provider (step 103). In reply to the data transmission request, the content provider initiates data transmission (step 104), and after completion of the data transmission, sends a data transmission end message to the wireless terminal (step 105). After completion of receiving the data, the wireless terminal sends a data reception end message to the content provider (step 106), and typically ends the access to the content provider by sending an access and message (step 107).

However, the wireless terminal with a web browser has many limitations in transmitting and receiving a large amount of data over the Internet, due to its limited memory capacity and other factors such as bandwith constraints, etc.

SUMMARY OF THE INVENTION

It is, therefore, an object of the present invention to provide a system and method for allowing a user of a wireless terminal to obtain desired information through access to the Internet and transmit the information to a data terminal, rather than receiving and storing the information directly in the memory of the wireless terminal.

To achieve the above and other objects, the present invention provides a data communication method using a wireless terminal capable of accessing the Internet. The wireless terminal accesses the Internet, and then sends a data transmission request to a content provider. The wireless terminal provides the content provider with an IP address and associated information of a data terminal to which the data is to be transmitted. The content provider then transmits the data to the data terminal based on the IP address and the associated information.

Preferably, the content provider sends a data transmission end message to the wireless terminal after completion of the data transmission to the data terminal.

Further, the present invention provides a data communication method using a wireless terminal capable of accessing the Internet. The wireless terminal accesses the Internet, and then sends a data transmission request to a content provider. Upon receiving a destination inquiry message from the content provider, the wireless terminal provides the content provider with an E-mail address to which data is to be transmitted. The contents provider then transmits the data based on the E-mail address.

Preferably, the content provider sends a data transmission end message to the wireless terminal after completion of the data transmission to the e-mail address.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention with unnecessary detail.

Figure 1:
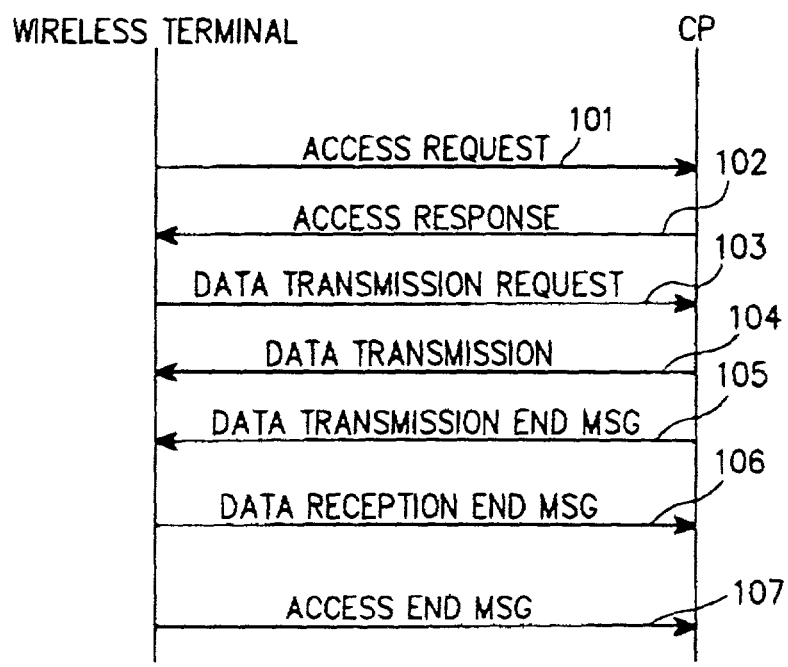
FIG. 1 illustrates a control flow diagram for data communication between a wireless terminal and a content provider over the Internet.
Figure 2:
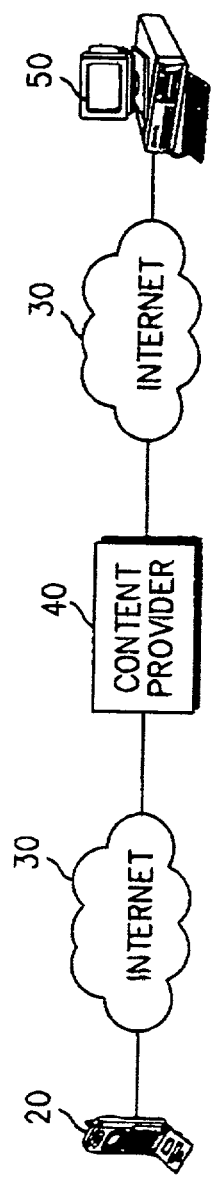
FIG. 2 illustrates a configuration of a communication network to which the present invention is applied.

FIG. 2 illustrates a configuration of a communication network to which the present invention is applied. Referring to FIG. 2, a wireless terminal 20, preferably a mobile phone, can access a content provider 40 through the Internet 30. A user of the wireless terminal 20 can get desired information by accessing the content provider 40 using a wireless Internet access function and then searching information. The content provider 40 is connected to a data terminal 50 such as a notebook computer or a desktop computer through the Internet 30. The data terminal 50 can access a web server, which may be managed by the content provider 40, and download information.

In the embodiment of the present invention, when the user desires to access the content provider 40 over the Internet 30 using the wireless terminal 20 and download information, the wireless terminal 20 provides the content provider 40 with an IP (Internet Protocol) address of the data terminal 50, thereby enabling direct data communication between the data terminal 50 and the content provider 40.

Preferably, the wireless terminal 20 may employ a security application program such as SSL (Secure Sockets Layer) and PKI (Public Key Infrastructure) in accessing the content provider 40 through the Internet 30. Also, the content provider 40 may use the security application program in transmitting login information for accessing the data terminal 50 through the Internet 30 for information download.

Figure 3:
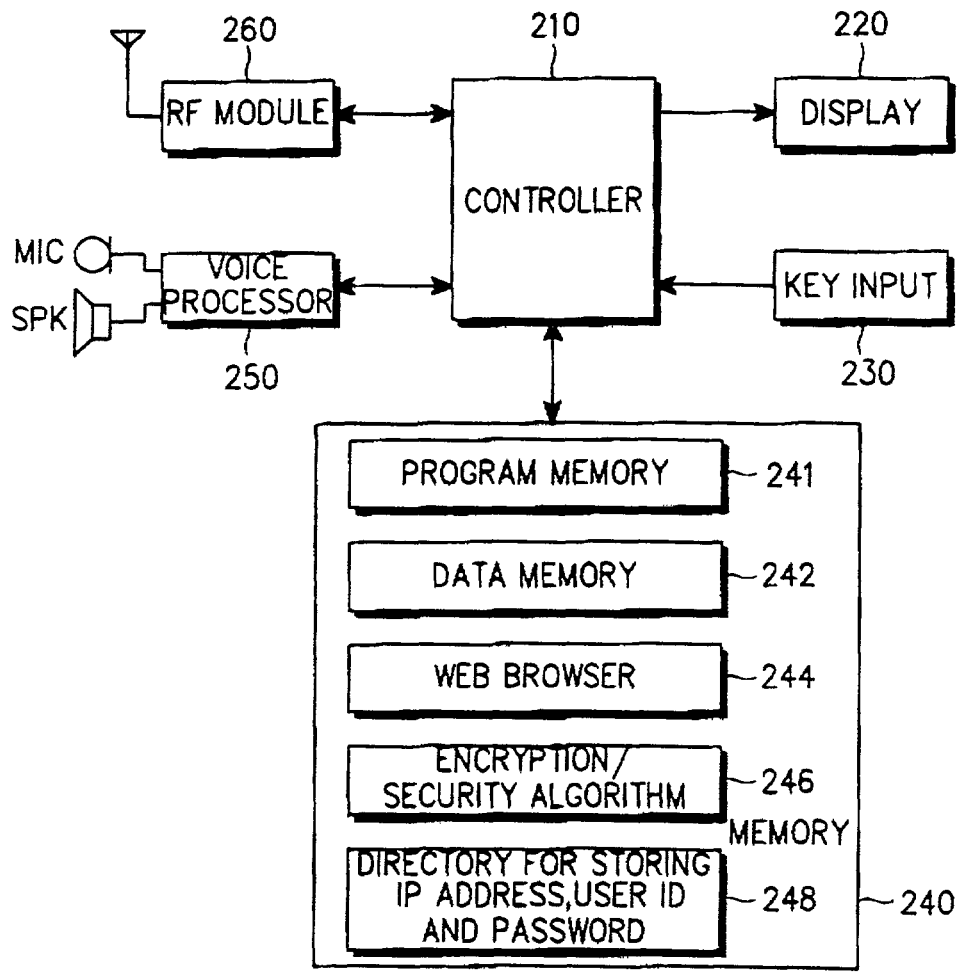
FIG. 3 is a block diagram of the wireless terminal with a wireless Internet access function.

FIG. 3 is a block diagram of the wireless terminal 20 with a wireless Internet access function, such as that shown in FIG.

2. Referring to FIG. 3, a controller 210 controls the overall operation of the wireless terminal 20. When the wireless terminal 20 accesses the content provider 40 over the Internet 30 for data transmission and reception, the controller 210 transmits an IP address of a data terminal 50 (e.g., a notebook computer or a desktop computer) and its associated information to the content provider 40 to enable data communication between the content provider 40 and the data terminal 50. Alternatively, the controller 210 may transmit to the content provider 40 an E-mail address at which the user desires the information is to be received.

An RF (Radio Frequency) module 260 transmits/receives voice and other data under. the control of the controller 210. A voice processor 250, under the control of the controller 210, converts voice data received from the RF module 260 to an audible signal and outputs the audible signal through a speaker SPK. Further, the voice processor 250 converts a voice signal received from a microphone MIC to voice data and provides the voice data to the RF module 260. A key input section 230 includes a plurality of alphanumeric keys and function keys, and provides the controller 210 with key input data corresponding to a key input by the user. A display 220 displays various messages under the control of the controller 210. A memory 240 includes a program memory 241 for storing key input data and program data, needed to control operation of the wireless terminal 20 according to the present invention, and a data memory 242 for storing data generated by the user or generated or received by the wireless terminal 20 during the operation. Further, the memory 240 includes a wireless Internet web browser 244, an encryption/security algorithm 246, and a directory 248 for storing an IP address, a user ID (identification) and a password, for accessing the data terminal 50.

Figure 4:
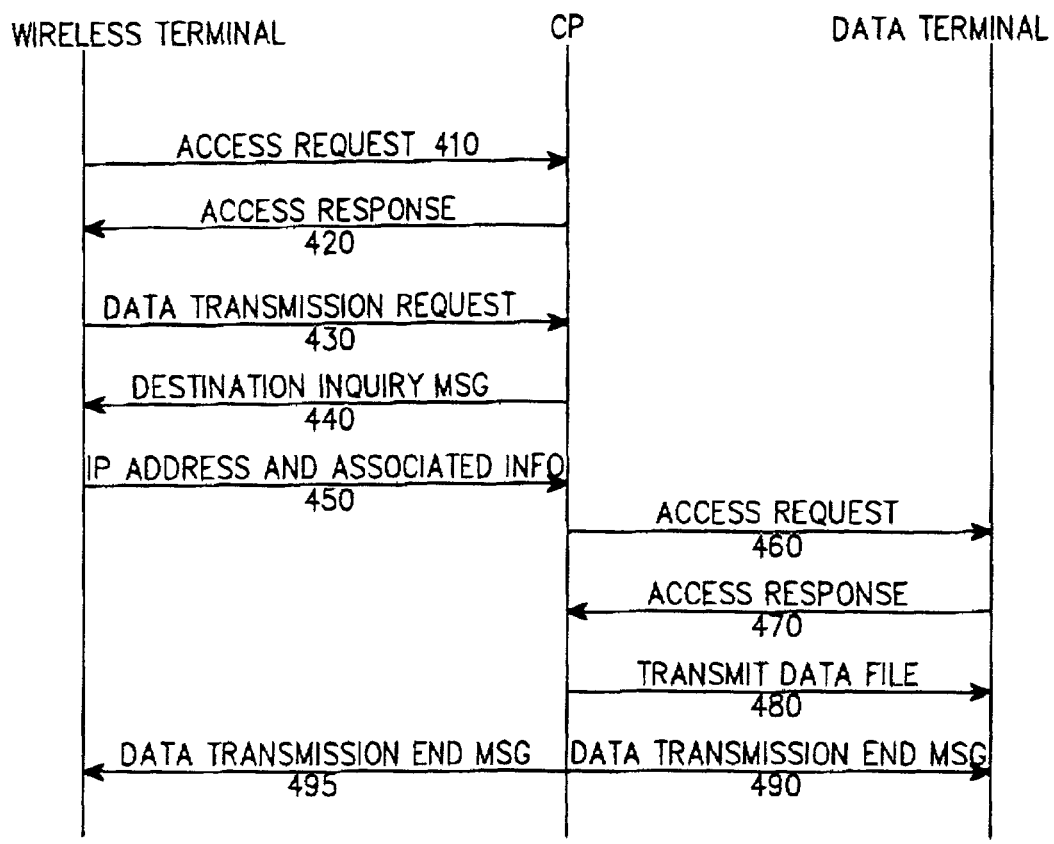
FIG. 4 illustrates a control flow diagram for data communication among a wireless terminal, a content provider and a data terminal according to a preferred embodiment of the present invention.

FIG. 4 illustrates a control flow diagram for data communication among a wireless terminal, a content provider and a data terminal according to a preferred embodiment of the present invention. The preferred embodiment of the present invention will now be described in detail with reference to FIGS. 2 to 4.

First, the wireless terminal 20 accesses the content provider 40 through the Internet 30 by sending an access request (step 410). A user of the wireless terminal 20 can select desired information displayed on the display 220 through information searching after accessing the content provider 40 (step 420). Subsequently, the user sends a data transmission request (step 430) to the content provider 40 using the wireless terminal 20 to download a desired data file.

Upon receipt of the data transmission request from the wireless terminal 20, the content provider 40 sends the wireless terminal 20 a destination inquiry message (step 440) inquiring about an IP address to which the user desires to download the data file, and about access information, e.g. user ID, password, and ESN (Electronic Sequence Number). Upon receipt of the destination inquiry message, the user of the wireless terminal 20 personally inputs an IP address of the data terminal 50 and its associated information using the key input section 230, or the wireless terminal 20 reads the IP address of the data terminal 50 and the associated information from the directory 248 stored in the memory 240 and then provides them to the content provider 40 (step 450). Based on the IP address and its associated information, the content provider 40 attempts an access to the data terminal 50 to which the data file is to be downloaded, by sending an access request (step 460). The data terminal 50 sends an access response to the content provider 40 and accesses the content provider 40 over the Internet 30 (step 470). The content provider 40 then starts to transmit the data file requested by the wireless terminal 20 to the data terminal 50 (step 480), and after completion of the data transmission, sends a data transmission end message to the data terminal 50 (step 490). Preferably, the content provider 40 may transmit the data transmission end message even to the wireless terminal 20 (step 495).

In this manner, the user of the wireless terminal 20 can download from the Internet a data file into a desired data terminal 50, such as a notebook computer or a desktop computer, rather than to the wireless terminal 20.

In the present invention, the wireless terminal provides an IP address of the data terminal and its associated information to the content provider. Alternatively, however, the wireless terminal may provide the content provider with an E-mail address at which the user desires the data file to be downloaded, or an IP address and associated information of another wireless terminal.

While the invention has been shown and described with reference to a certain preferred embodiment thereof, it will be understood by those skilled in the art that various changes in form and details may be made therein without departing from the spirit and scope of the invention, as defined by the appended claims.

What is claimed is:

1. A method for transmitting data from a content provider, when transmitting is requested by a wireless phone and the data is transmitted to a wireless computer, comprising the steps of:

accessing the content provider via the Internet by the wireless phone;

selecting, by the wireless phone, a file from file information accessed in the content provider;

sending a data transmission request for the selected file from the wireless phone to the content provider;

after sending the data transmission request for the selected file, receiving a destination inquiry message from the content provider at the wireless phone in response to the data transmission request, wherein the destination inquiry message requests an Internet Protocol (IP) address of the wireless computer and associated information, wherein the associated information comprises a password for accessing the wireless computer;

providing the IP address of the wireless computer with the associated information to the content provider from the wireless phone; and after accessing the wireless computer using the associated information, transmitting data corresponding to the data transmission request for the selected file from the content provider to the wireless computer based on the IP address without transmitting the data to the wireless phone.

2. The method of claim 1, wherein the content provider sends a data transmission end message to the wireless phone and the wireless computer after completion of the data transmission.

3. A method of transmitting data from a content provider, when transmitting is requested by a wireless phone and the data is transmitted to a wireless computer, comprising the steps of:

accessing the content provider via the Internet by the wireless phone;

selecting, by the wireless phone, a file from file information accessed in the content provider;

sending a data transmission request for the selected file from the wireless phone to the content provider;

after sending the data transmission request for the selected file, receiving a destination inquiry message from the content provider at the wireless phone in response to the data transmission request, wherein the destination inquiry message requests an E-mail address of the wireless computer and associated information, wherein the associated information comprises a password for accessing the wireless computer;

providing the E-mail address of the wireless computer with the associated information to the content provider from the wireless phone; and after accessing the wireless computer using the associated information, transmitting data corresponding to the data transmission request for the selected file from the content provider to the wireless computer based on the E-mail address without transmitting the data to the wireless phone.

4. The method of claim 3, wherein the content provider sends a data transmission end message to the wireless phone and the wireless computer after completion of the data transmission.

5. A data communication system using a wireless terminal, comprising:

a wireless phone for wirelessly accessing a content provider via the Internet, selecting a file from file information accessed in the content provider, sending a data transmission request for the selected file to the content provider, after sending the data transmission request for the selected file, receiving a destination inquiry message from the content provider, and transmitting an Internet Protocol (IP) address of a wireless computer with associated information to the content provider in response to the destination inquiry message, wherein the associated information comprises a password for accessing the wireless computer; and the content provider for analyzing the data transmission request from the wireless phone, transmitting the destination inquiry message to the wireless phone in response to the data transmission request, wherein the destination inquiry message requests the IP address of the wireless computer and the associated information, and after accessing the wireless computer using the associated information, transmitting data corresponding to the data transmission request to the wireless computer based on the IP address of the wireless computer, without transmitting the data to the wireless phone.

6. The method of claim 1, wherein the associated information further comprises a user identification (ID) for accessing the wireless computer.

7. The method of claim 3, wherein the associated information further comprises a user identification (ID) for accessing the wireless computer.

8. The method of claim 1, wherein the wireless computer is not a printer.

9. The method of claim 3, wherein the wireless computer is not a printer.

10. The data communication system of claim 5, wherein the wireless computer is not a printer.

11. The data communication system of claim 5, wherein the associated information further comprises a user identification (ID) for accessing the wireless computer.

* * * * *